United States Patent [19]

Brown et al.

[11] Patent Number: 5,080,787
[45] Date of Patent: Jan. 14, 1992

[54] HIGH-PRESSURE FILTER ASSEMBLY, METHOD AND APPARATUS FOR FORMING HIGH-PRESSURE FILTERS

[75] Inventors: Gene W. Brown; William R. Knox, both of Cookeville, Tenn.

[73] Assignee: Fleetguard, Inc., Columbus, Ind.

[21] Appl. No.: 430,364

[22] Filed: Nov. 2, 1989

[51] Int. Cl.⁵ .................... B01D 27/08; F16J 15/00
[52] U.S. Cl. .................... 210/232; 210/352; 210/444; 210/445; 210/450; 210/DIG. 17; 215/325; 215/327; 277/183; 277/189; 277/214; 277/215
[58] Field of Search .................. 29/505; 210/168, 232, 210/440, 443, 444, 450, DIG. 17, 352; 215/325, 327, 324; 123/196 A; 277/183, 189, 214, 215; 55/502

[56] References Cited

U.S. PATENT DOCUMENTS

| | | | |
|---|---|---|---|
| 771,712 | 10/1904 | Coale et al. | 215/325 |
| 1,595,304 | 8/1926 | Hulbert | 29/505 |
| 1,851,938 | 3/1932 | Rieke | 285/203 |
| 3,685,658 | 8/1972 | Baldwin | 210/440 |
| 3,847,819 | 11/1974 | Firth | 210/444 |
| 3,931,015 | 1/1976 | Jenkins | 210/450 |
| 4,093,548 | 6/1978 | Sterkenburg et al. | 210/180 |
| 4,316,801 | 2/1982 | Cooper | 210/90 |
| 4,324,660 | 4/1982 | Peyton et al. | 210/440 |
| 4,369,113 | 1/1983 | Stifelman | 210/440 |
| 4,507,201 | 3/1985 | Wall et al. | 210/450 |
| 4,617,117 | 10/1986 | Messinger et al. | 210/450 |
| 4,738,776 | 4/1988 | Brown | 210/DIG. 17 |
| 4,743,374 | 5/1988 | Stifelman | 210/440 |
| 4,834,885 | 5/1989 | Misgen et al. | 210/440 |

FOREIGN PATENT DOCUMENTS

| | | | |
|---|---|---|---|
| 284264 | 9/1988 | European Pat. Off. | 210/DIG. 17 |
| 361338 | 10/1922 | Fed. Rep. of Germany | 215/325 |
| 236421 | 10/1964 | Fed. Rep. of Germany | 210/168 |
| 2445454 | 4/1976 | Fed. Rep. of Germany | 210/DIG. 17 |
| 2226199 | 11/1974 | France | 210/168 |
| 982548 | 2/1965 | United Kingdom | 210/168 |
| 1254274 | 11/1967 | United Kingdom | 210/168 |
| 1525689 | 9/1978 | United Kingdom | 210/DIG. 17 |

Primary Examiner—Robert A. Dawson
Assistant Examiner—Joseph Drodge
Attorney, Agent, or Firm—Sixbey, Friedman, Leedom & Ferguson

[57] ABSTRACT

A high-pressure filter assembly which includes a cover or nutplate secured to a housing via a sidewall portion of the housing deformed into a groove formed in the cover sidewall. The cover and housing are formed such that the cover can be properly seated upon the housing prior to seaming without special locators or beads formed in the container sidewall. A method and apparatus for forming the filter assembly are also disclosed.

30 Claims, 5 Drawing Sheets

HIGH-PRESSURE FILTER ASSEMBLY, METHOD AND APPARATUS FOR FORMING HIGH-PRESSURE FILTERS

TECHNICAL FIELD

The present invention relates to a high-pressure fluid filter assembly of the spin-on type, and a method and apparatus for forming a high-pressure filter. More particularly, the invention relates to a spin-on filter in which a rigid cover is secured to a filter housing by an improved coupling between the cover and housing, and a method and apparatus for coupling the cover and housing.

BACKGROUND OF THE INVENTION

Spin-on filters have been employed in a variety of applications including hydraulic systems and engine lubrications systems. Such filters generally include a filter element within a housing with a cover or nut plate secured at one end of the housing by which the filter can be screwed onto or off of a filter head. A central opening and several surrounding openings are provided in the cover to direct flow through the filter and filter element therein. In an inside/out flow arrangement, the fluid enters the central opening and exits through the surrounding openings after passing through the filter element within the housing. In an outside/in flow pattern, the fluid enters the surrounding openings and exits through the central opening after passing through the filter element. A circular gasket is provided on a top surface of the cover to serve as a seal between the filter and the filter head. A spring is often provided in the lower end of the housing to maintain the filter element in sealing engagement with the cover.

Although satisfactory in low and medium applications, generally spin-on filters of the prior art have not been satisfactory for use in high-pressure applications such as in hydraulic transmission pumps, where surges of 1000 psi or more can occur. Most spin-on filters currently available include covers constructed of a stamped steel disk, and a relatively thinner secondary disk spot welded thereto. The base disk includes an extruded, relatively shallow, internally threaded neck portion by which the filter can be connected to a filter head. Flow openings are punched into the base disk around the neck portion. The lip at the open end of the housing is connected, by means of a rolled lock seam, to the periphery of the secondary disk which is also formed to serve as a seat for the external gasket. In this design, fatigue failure is most likely to occur at the rolled lock seam or at the spot welds. A burst failure is most likely to occur either upon bending of the cover (which allows leakage past the external gasket) or upon unfolding of the rolled seam. Thus, prior art spin-on filters have been susceptible to failure at the cover and-/or at the connection between the cover and housing. Welding of the housing and cover is often unacceptable due to the incompatibility of housing and cover materials such that a satisfactory weld cannot be formed.

U.S. Pat. No. 4,369,113 to Stifelman discloses a high strength spin-on filter in which a cover is inserted into the open end of a housing, and the open end of the housing is folded inwardly and back on itself over the peripheral rim of the cover to form a folded connection between the cover and housing. The cover includes a plurality of projecting rib portions which deform the housing at selected locations, such that relative rotation between the cover and housing is prevented. In addition, a somewhat curved portion or shoulder (often referred to as a bead) is provided in the housing sidewall upon which the cover sits to properly locate the cover prior to folding the housing open end over the cover. However, the deformation of the housing sidewall for anti-rotation purposes and for locating the cover result in stress concentrations which can result in failure, particularly after extended use. More significantly, special tooling is required for controllably folding the housing open end over the cover periphery and back upon itself. Such a folding operation is costly and time consuming since it requires both a 180° and a 90° folding of the circumference of a tubular housing rim.

U.S. Pat. No. 4,743,374 to Stifelman discloses a high-strength filter in which the open end of the housing is folded over the periphery of the cover member and into a groove formed in the top of the cover. The groove includes a plurality of projecting members which extend into the groove and engage with the housing to prevent relative rotation between the housing and the cover. As with the '113 device, special tools are required to fold the housing both over the periphery of the cover, and back on itself. Such a folding operation cannot be accomplished by a spin-seaming technique, which is often preferred due to the simplicity and rapid production time associated with spin-seaming. In addition, the '374 device also utilizes a shoulder or bead portion located below the cover for properly locating the cover within the housing prior to the folding operation. The '374 device also requires a complicated cover member in requiring both a top groove and projecting portions formed within the grooves Thus the '374 device requires die casting and machining of the cover which is not always possible and/or practical.

U.S. Pat. No. 4,834,885 to Misgen et al. discloses a seal arrangement for fluid filters in which the housing is folded over the cover and the gasket seal (forming the seal between the filter and filter head) is placed over the folded-over portion An additional folding step then folds an additional portion of the housing upon the side of the sealing gasket. However, such an arrangement requires a complicated folding operation in interconnecting the housing with the cover and the sealing gasket. In addition, in the Misgen et al. arrangement, the housing sidewall is deformed for anti-rotation purposes, which can lead to localized weakened portions and/or stress concentrations in the housing sidewall. Misgen et al. also utilizes a bead or shoulder portion located below the cover for seating the cover prior to closing of the open housing end over the cover, which also leads to stress concentrations.

SUMMARY OF THE INVENTION

It is therefore an object of the present invention to provide a high strength filter capable of withstanding high-pressures.

It is another object of the invention to provide a high-pressure filter in which deformations in the housing sidewall on the pressurized side of the housing-/cover joint are avoided.

It is a further object of the invention to provide a high-pressure filter in which the housing is coupled to a cover plate without substantial thinning or stretching of the housing at the joint/bead.

It is a further object of the invention to provide a housing/cover joint which prevents relative rotation between the housing and cover without deforming the housing sidewall on the pressurized side of the joint.

It is another object of the invention to provide a high-pressure filter which utilizes a relatively simple cover plate design which may be either die cast or machined.

It is a further object of the invention to provide a high-pressure filter in which the filter housing can be coupled to the cover in a simple one-step operation.

It is yet another object of the invention to provide a method and apparatus for forming a high-pressure filter in which the filter housing is coupled to the filter cover by a simple spin-beading operation.

It is a further object of the invention to provide a method and apparatus for coupling a filter cover and housing, by deforming the housing into engagement with the cover without substantial thinning of the housing.

It is a still further object of the present invention to provide a high-pressure filter in which the cover can be easily located or seated within the housing without the use of a shoulder formed in the housing sidewall below the joint.

These and other objects and advantages are achieved in accordance with the present invention in which a filter cover is provided having a groove formed in the cover sidewall, with the housing deformed into the sidewall groove. In a preferred embodiment, a portion of the filter housing which is proximate to the housing open end is pressed into the sidewall groove of the cover plate while simultaneously engaging the upper edge of the housing, such that the housing sidewall portion substantially conforms to the surface of the groove, without substantial stretching or thinning of the housing sidewall. Interruptions are provided in an upper wall of the groove, and the upper edge of the housing is deformed into the interruptions to prevent relative rotation between the housing and cover plate. Optionally, for even higher strength, a collar can be placed about the housing portion deformed into the groove. The cover is provided with a top portion having a diameter greater than the remainder of the cover, such that the enlarged diameter portion can be seated upon the housing without the use of shoulders formed in the housing sidewall.

In the preferred method/apparatus, a roller includes a rounded periphery and a stepped portion spaced radially inwardly therefrom, such that the edge of the housing is engaged by the stepped portion and an outer portion of the housing sidewall portion (engaged by the rounded periphery) of the housing as the housing is deformed into the groove. A punch technique is then utilized to deform selected housing edge portions into interruptions extending from the cover plate groove. Alternatively, to deform the selected edge portions, a second roller may be utilized which includes a plurality of pins, corresponding to the number of interruptions extending from the cover plate groove such that the edge of the housing is deformed into the interruptions.

The above as well as other advantages will become apparent from the following detailed description of the present invention read in conjunction with the drawings.

DETAILED DESCRIPTION OF THE PREFERRED EMBODIMENT

Figure 1:
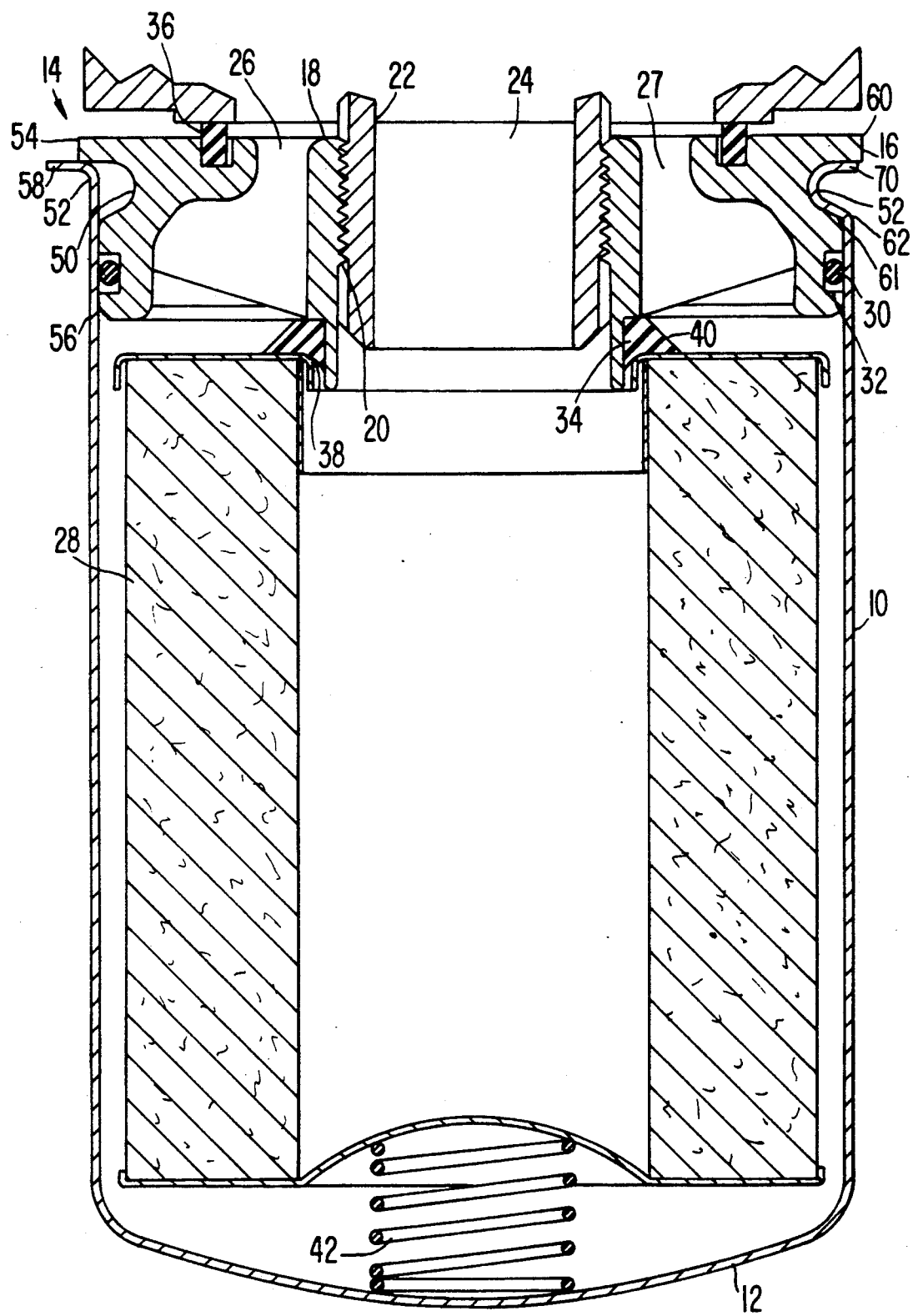
FIG. 1 is a cross-sectional view of a filter formed in accordance with the present invention.
Figure 2:
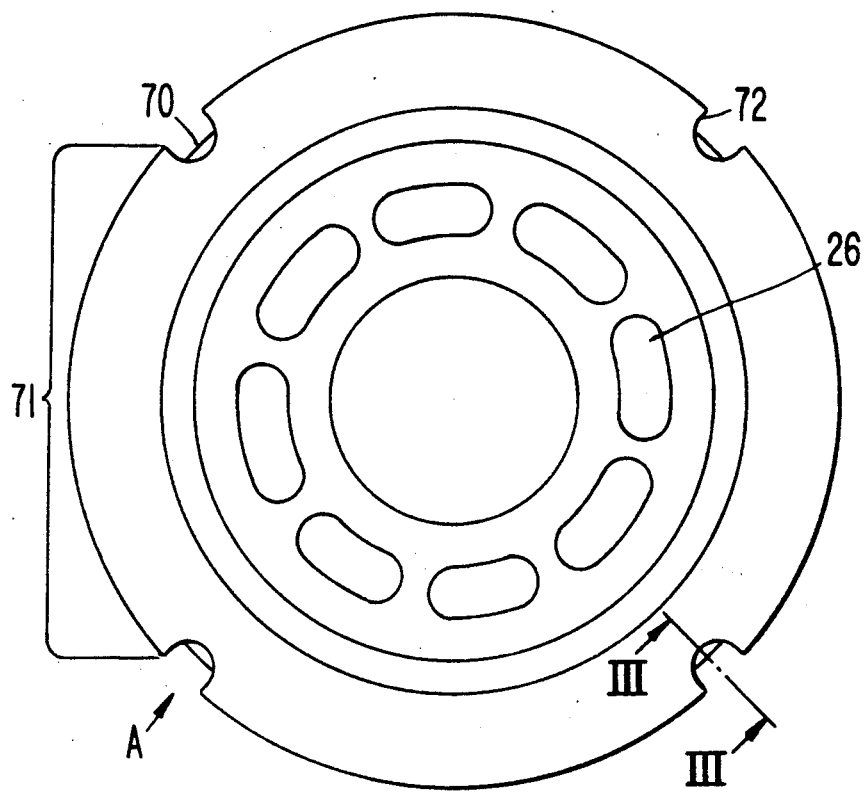
FIG. 2 is a top plan view of the filter of FIG. 1.

FIG. 1 illustrates a cross-section of a preferred embodiment of the present invention which includes a housing 10 having a bottom closed end 12 and a upper open end 14. The open end of the housing receives a cover or nutplate 16 which includes a central hub 18 having an internally threaded portion 20 which mates with corresponding threaded portions of a filter head 22 such that the filter can be removably mounted to a device which utilizes the fluid being filtered. The central hub is connected to the outer periphery of cover by a plurality of ribs 27. The ribs 27 also separate the surrounding flow opening 26. The embodiment of FIGS. 1 and 2 illustrate a die cast cover, however the cover can be easily machined by simply replacing the flow opening/rib arrangement 26,27 with bore holes extending through a solid cover. In the preferred form, an aluminum cover is utilized, however other materials are also possible.

A substantially cylindrical filter element 28 is provided through which the fluid passes to filter the fluid medium. In order to prevent leakage of the fluid being filtered, and to define the flow path through the filter, three sets of seals are provided. A first seal 30 provides a seal between the cover plate and the housing and includes an O-ring seated within a groove 32 formed in the cover. A second seal 34 includes a gasket which forms a seal between the cover and the filter element. A third seal 36 includes a gasket which forms a seal between the cover and the device which utilizes the fluid being filtered, when the filter is spun-onto the filter head. It is to be understood that other types of seals may be utilized, such as silicon seals which are applied in a somewhat paste-like or gelatinous form and hardened to form elastomeric seals.

In accordance with one aspect of the present invention, the seal 34 is provided having an inner portion which is thicker than a radially spaced outer portion. The seal is substantially trapezoidal in cross-section, except, the base 38 has an angled rather than flat configuration. The seal 34 is formed such that the upwardly directed force of the cylindrical filter element is absorbed by the seal, in forming a fluid impervious seal between the seal 34 and the filter element. The seal 34 allows the use of a filter element having an inside diameter which is greater than the outer diameter of the hub 18 of the cover. Due to the configuration of the seal 34, the force of the filter element will not cause rolling of the gasket, which may cause leakage at the seal. In addition, the seal gasket 34 includes an inclined outer portion 40 which improves flow of the fluid, either radially outwardly in an outside/in flow pattern, or in directing the flow upwardly in an inside/out flow pattern. A spring 42 is provided at the bottom of the housing to urge the cylindrical filter element 28 in sealing engagement with the gasket 34.

As shown in the upper portion of FIG. 1 in accordance with the present invention, a portion of the housing which is proximate to the open end of the housing is deformed into a somewhat C-shaped groove 50 in the sidewall of the cover. For illustrative purposes, the housing portion 52 proximate the open end is shown on the left-hand portion of the drawing in the state prior to deformation into the groove 50. The right-hand portion of the housing is shown with the housing portion proximate the housing open end deformed into the groove. It is to be understood that the entire periphery of the housing is deformed into the groove upon completion of the joint/bead. The groove acts as a back-up surface, applying a reaction force upon the housing sidewall as it is deformed into the groove such that the housing sidewall portion substantially conforms to the inwardly spaced cover peripheral portion defined by the groove. In other words, the groove acts to deform the housing sidewall radially outwardly as the sidewall is deformed radially inwardly.

As shown in the left-hand portion, the upper end 54 of the cover has a slightly larger diameter than the lower portion of the cover (for example, as shown at 56) such that when the cover is inserted, the cover is aligned or seated upon the base 58 of the inverted L-shaped (cross-sectional) flange of the undeformed housing portion proximate the housing open end. Thus, separate shouldered portions of the housing are not required for seating of the cover. The housing 10 is formed of drawn steel, with the lip 58 remaining after drawing. In conventional filter arrangements a bead or shouldered portion is formed in the housing sidewall upon which the bottom of the cover is seated prior to seaming (i.e., a shoulder would be formed in the housing below the cover portion 56). The present invention avoids the use of such a shoulder on the pressurized side of the joint by providing a top cover portion of increased diameter to allow seating upon the flange 58 of the housing.

As shown in the right portion of FIG. 1, the housing portion 52 is deformed to substantially conform to the interior of the groove 50. The groove is substantially C-shaped in cross-section and includes upper 60 and lower 62 wall portions In accordance with a further aspect of the invention, the upper wall of the groove includes a plurality of interruptions or recesses formed therein. As shown in FIG. 2, the interruptions include four semi-cylindrical recesses 72 into which selected edge portions 70 of the housing are deformed to prevent relative rotation between the housing and the cover. While four recesses are shown in the preferred embodiment, it is to be understood that any number of recesses may be utilized in accordance with the present invention.

Figure 3A:
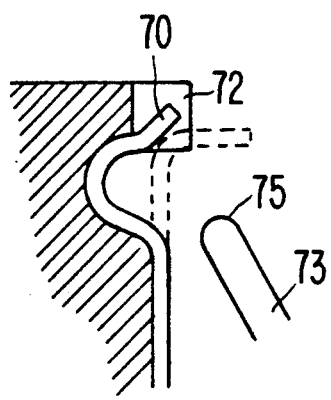
FIGS. 3A–B show detailed views of the anti-rotation feature of the present invention.
Figure 3B:
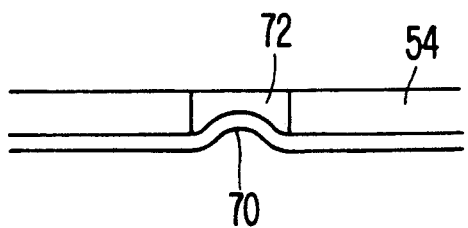

FIG. 3A shows a detailed section along line III—III of FIG. 2. As shown in FIG. 3A, after the housing portion 52 proximate the open end of the housing is deformed into the groove 50, the edge portion of the housing 70 is deformed upwardly into the four recesses. FIG. 3B shows a side view of the upper portion 54 of the cover as seen in the direction of arrow A of FIG. 2A. As shown in FIG. 3B, the edge 70 is deformed upwardly into the recess 72 such that rotation between the cover plate 16 and the housing 10 is prevented. While various types of interruption or recess configurations are possible, a semi-cylindrical recess having a diameter of approximately 0.250 inches, with the edge 70 arcuately (FIG. 3B) deformed to a 0.078 inch radius has produced satisfactory anti-rotational results. As shown in FIG. 2, the top of the cover includes radially projecting portions (as bracketed at 71) which form the enlarged diameter section 54 of the cover, with the recesses between the radial projections. In contrast to prior art arrangements, deformation of the housing sidewall (as in U.S. Pat. No. 4,369,113) is not necessary to prevent rotation Moreover, the design is much simpler to manufacture than the arrangement of U.S. Pat. No. 4,743,374 which requires folding of the housing over the periphery of the cover, and forming of projections within a cover top groove.

Thus, in accordance with the present invention, a high strength joint is provided by deforming a sidewall portion of the housing proximate the open end of the housing into a groove formed in the sidewall of the filter cover. In the embodiment of FIG. 1, a particularly high strength joint is formed since the housing is substantially conformed to the entire inner surface of the groove.

While various sizes and shapes of the cover and groove are possible, satisfactory results have been obtained utilizing a 0.160 depth groove (measured from the smaller diameter cover portion) with the top portion 54 having a diameter of 3.950 inches and the lower portion having a diameter of 3.700 inches. The groove inner surface was formed with a 0.125 radius, with the lower wall 62 of the groove angled 20° below horizontal and the upper wall of the groove 60 angled 5° above horizontal. The shoulder 61 formed at the edge of the lower wall was formed with a 0.050 inch radius. The above dimensions are exemplary, and not to be construed as limiting the present invention. Deeper grooves with narrower top and bottom wall angles would be expected to yield higher strength, however deformation of the housing to conform to the groove becomes more difficult. The above arrangement has proven successful for pressures in excess of 1,000 psi, utilizing a housing with a 0.052 inch thickness.

Figure 5A:
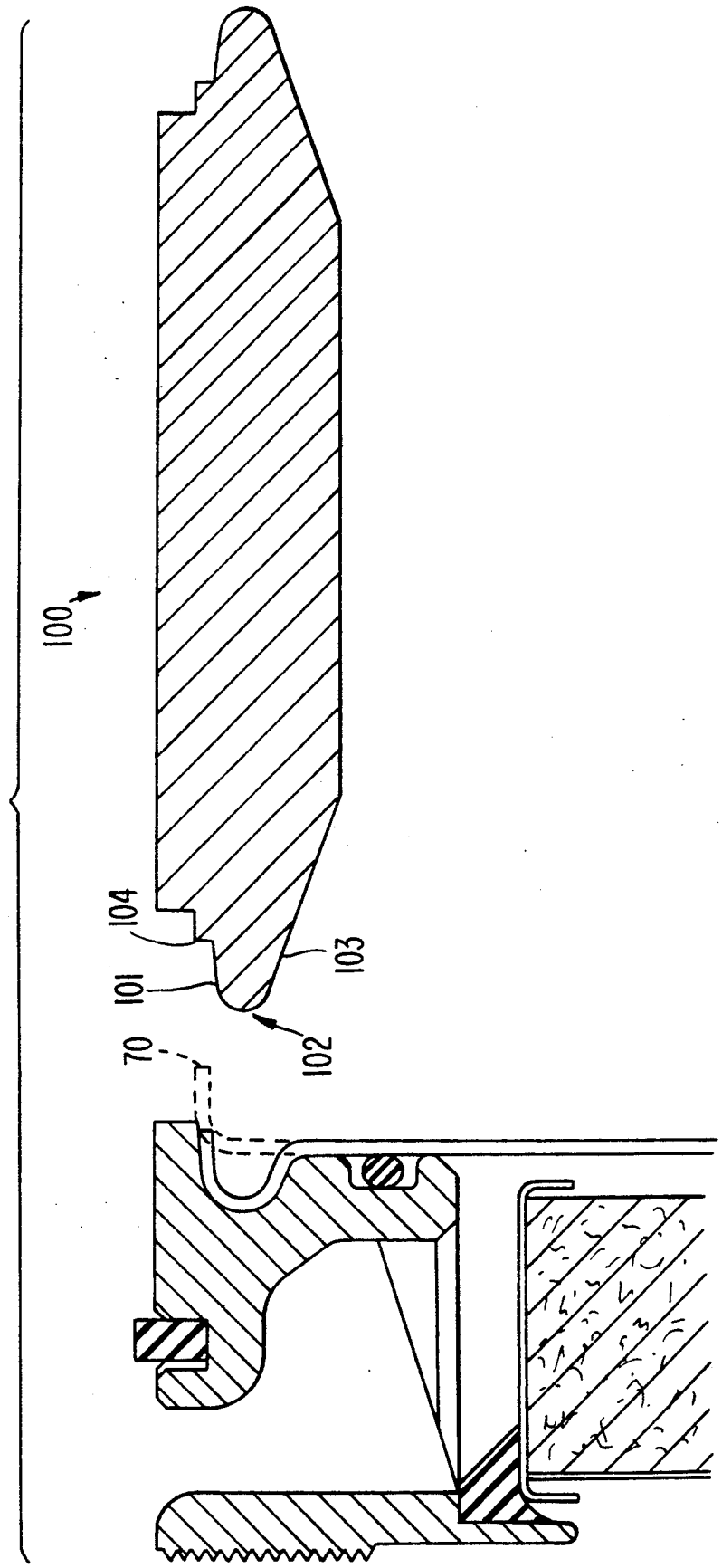
FIGS. 5A–C illustrate the apparatus for forming the housing/cover joint of FIG. 1.

FIG. 5A illustrates a preferred method and apparatus for forming the joint of the filter of FIG. 1. As shown in FIG. 5A, a roller 100 is provided for performing a spin-beading operation about the filter such that the filter and roller are spun to form the joint about the entire periphery of the filter. In use, the filter is spun while the non-driven roller 100 is frictionally engaged therewith, such that the roller rotates with the filter to form the joint/bead lock between the housing and cover. Significantly, in accordance with the present invention, the roller includes an outer peripheral rounded portion 102 which is complimentarily shaped according to the shape of the groove such that the housing portion is deformed to substantially conform to the inner surface of the groove. To achieve the conformance of the housing with the inner portion of the groove without substantial stretching of the housing, roller includes a stepped portion 104 which engages the edge of the housing 70 such that the edge is pushed inwardly toward the groove by step 104 as the outer periphery of the roller 102 deforms the housing to substantially conform to the inner surface of the groove. Thus, in accordance with the present invention, a high strength joint is formed in a simple one-step spin beading operation. The spin beading is accomplished with a relatively simple apparatus and requires only on the order of 5 seconds to complete.

To conform the housing to the groove of FIG. 1, a peripheral portion 102 having a 0.071 inch radius, with the top wall 101 angled approximately 5° above horizontal and the bottom wall 103 angled approximately 20° below horizontal has been successful. The step is recessed 0.215 inches from the periphery with the overall outside diameter of the roller approximately 5½ inches. As set forth above, these dimensions are not to be construed as limiting the invention.

A preferred method/apparatus for swaging the housing utilizes a punch technique which can be mechanically automated. As shown in FIG. 3A, a punch 73 comprising an elongated rod having a rounded end 75 impacts the edge portion of the housing (after the housing is deformed into the groove), thereby deforming the edge portion into recess 72. The punch is inclined at an angle of approximately 45°, with the rounded edge having a radius of 0.078 inches. The edge portions can be deformed into the recesses using separate punch operations, or using a plurality of punches which deform selected edge portions simultaneously.

Figure 5B:
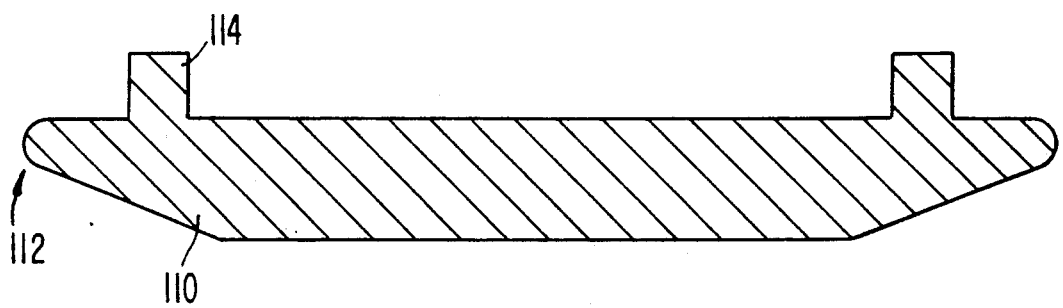
Figure 5C:
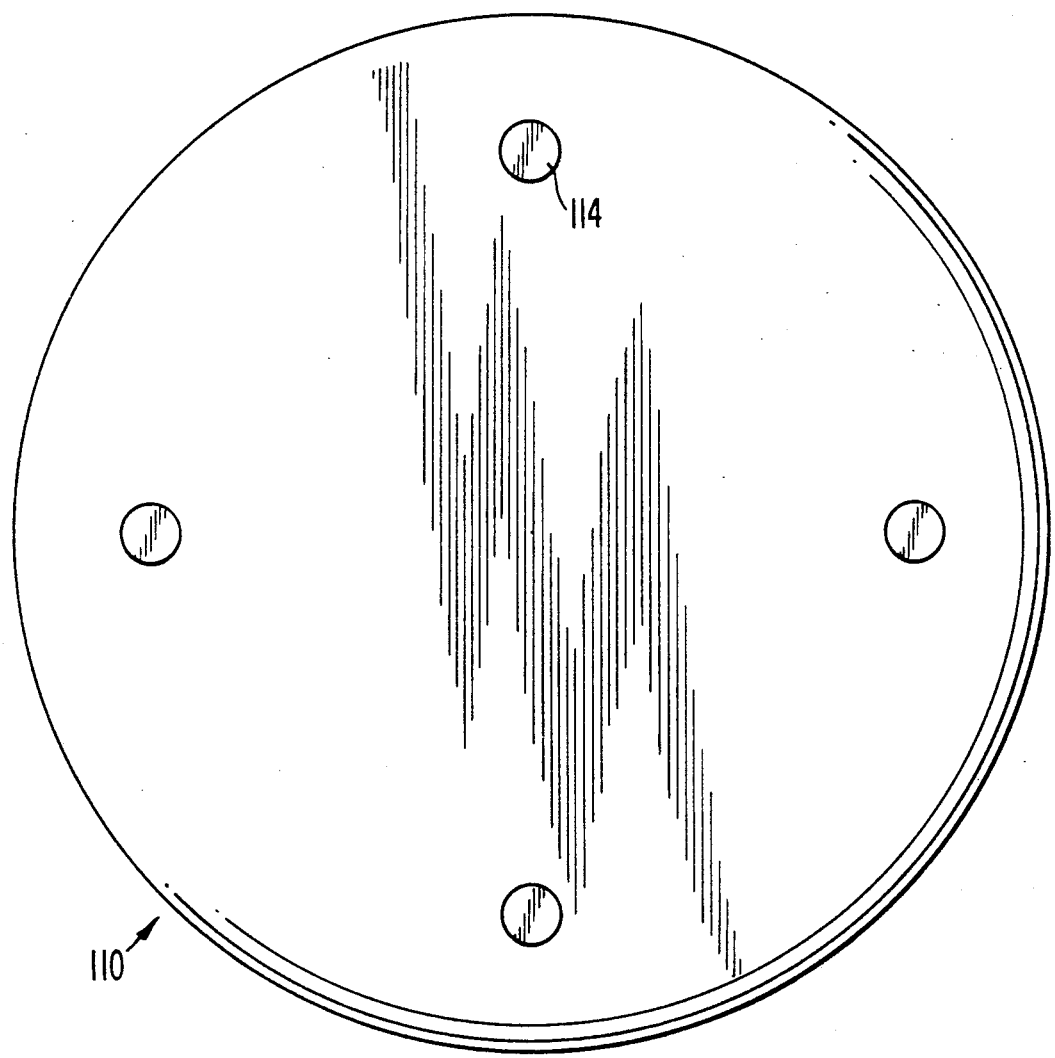

Alternatively, after the housing is deformed into the groove, a second roller may be utilized for deforming the edge portion 70 into the recesses 72. As shown in cross-sectional view of FIG. 5B, the roller 110 includes an outer peripheral portion 112 which is substantially the same shape as the outer peripheral portion of the first roller, and further includes pins 114 which deform or swage the selected edge portions of the housing 70 into the recesses 72 formed in the upper wall of the groove 50. FIG. 5C shows a top view of the roller of FIG. 5B with four pins, corresponding to the number of recesses formed in the cover. In operation, the roller is aligned such that the pins are in the proper rotational relationship with the recesses of the cover, and the roller and filter are rotated such that the outer peripheral portion of the roller maintains alignment as it is rotated within the groove, and the four pin portions of the roller deform the edge of the housing 70 into the recesses 72.

The overall operation is as follows: The housing is formed of drawn steel such that an upper portion proximate the open end of the housing is left with a flange, or in other words, has an inverted L-shaped cross-section. A spring 42 and substantially cylindrical filter element 28 are then provided within the housing and the cover or nutplate 16 is placed atop the filter element. Next, a pneumatic force applicator member applies a force to the cover (in a known manner) in opposition to the bias of spring 42 until the upper portion 54 of the cover is in engagement with the base 58 of the L. The cover is thus properly seated upon the housing such that the cover is received in the open end of the housing in proper relationship for the subsequent joint forming operation. The first roller 100 is then utilized to deform the housing portion proximate to the housing open end into the groove while the stepped portion 104 simultaneously engages the edge of the housing 70 such that the housing is deformed to substantially conform to the inner wall of the groove without substantial stretching or thinning of the housing. Next, four punches 73 deform selected edge portions 70 into the recesses 72 to prevent rotation between the housing and cover. Alternatively, a second roller 110 may be spun with the filter to deform the edge portions 70 at the locations of the recesses 72 to provide torque locking, or anti-rotation between the cover and housing.

Figure 4A:
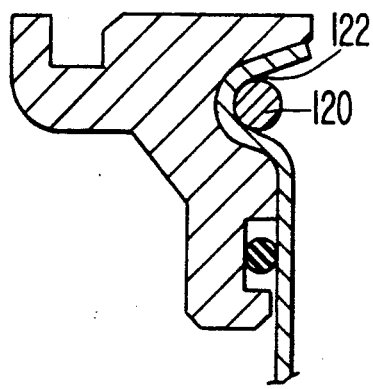
FIGS. 4A–E illustrate alternative embodiments of the joint/seam coupling the filter housing and cover plate.

Alternative embodiments of the joint between the cover plate and the housing are shown in FIGS. 4A–E. The joint of FIG. 4A is substantially the same as the joint of FIG. 1, however an additional garter or collar 120 is provided about the housing portion deformed into the groove. The collar may be of a circular cross-section, however, for best results, the collar should conform substantially to the outer periphery 122 of the housing portion deformed within the groove. The collar is utilized where even higher strength is desired than in the FIG. 1 design. For attachment of the collar, the collar is formed in a plurality of sections which are then fastened together, either by welding, mechanical fastening or gluing about the peripheral portion of the housing which is deformed into the groove.

Figure 4B:
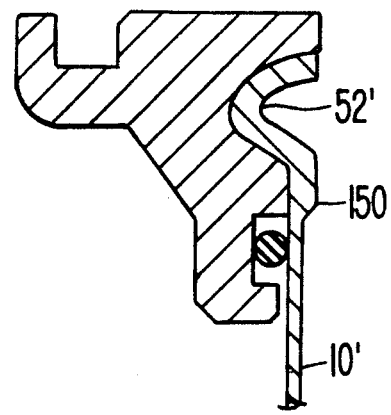

FIG. 4B shows an arrangement in which the shell or housing 10' is ironed to a thickness, for example 0.040 inches, while the shell portion near the open end is not ironed such that the housing is thicker, for example, 0.060 inches, at the joint. Ironing is utilized where desired length-to-diameter ratios are not obtainable with normal drawing. It is to be understood that, if desired, ironing could be utilized in lieu of drawing in each of the embodiments disclosed herein. In the FIG. 4B arrangement, high strength is achieved by utilizing an increased thickness in the housing portion which includes at least the portion 52' which is deformed into the groove, while low cost is maintained by utilizing a thinner housing portion for the remainder of the housing.

Figure 4C:
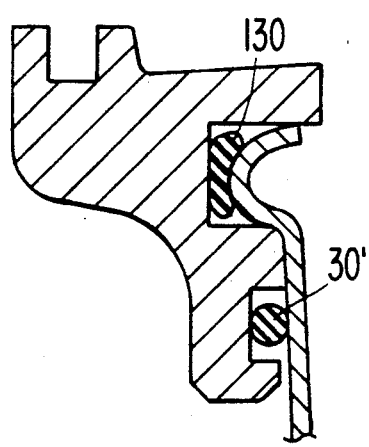

As shown in FIG. 4C, an additional sealing gasket 130 may be provided within the groove 50' of the cover. The additional elastomeric gasket not only provides an additional fluidic seal, but also prevents rotation between the housing and the nut plate, due to the friction between the housing and the seal 130. Preferably, the housing is deformed to at least partially deform into the elastomeric seal 130, thereby providing a fluidic seal and sufficient friction for anti-rotation. The seal 130 may be used as an additional seal between the housing and cover/nut plate, or in lieu of the O-ring seal 30'.

Figure 4D:
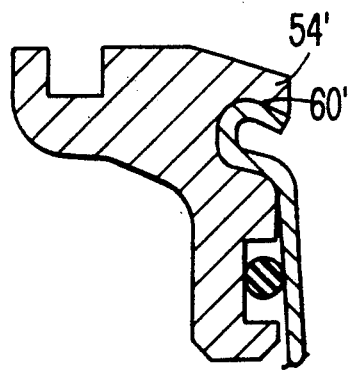

In the FIG. 4D arrangement, the upper end of the cover 54' is deformed slightly downwardly such that the upper wall portion of the groove 60' slopes downwardly toward the lower wall of the groove. The bending shortens the height of the gap formed by the groove to further improve the strength of the joint.

Figure 4E:
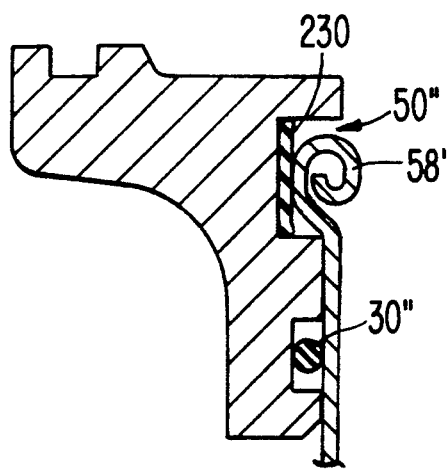

In the FIG. 4E embodiment, the housing is initially formed such that the inverted L-shaped portion has a longer base than in the FIG. 1 embodiment. After deformation into the groove 50", the base portion of the L 58' is then rolled upon itself to further strengthen the grip of the upper end of the housing within the groove, thereby strengthening the hydrostatic performance of the joint. As in the FIG. 4C arrangement, an additional gasket 230 may be provided for anti-rotation and to provide an elastomeric seal in addition to or in lieu of an O-ring seal 30".

INDUSTRIAL APPLICABILITY

The present invention provides a high strength filter capable of withstanding high pressures without failure occurring between the filter housing and cover/nutplate. The filter housing is joined to the cover utilizing a simple spin seaming operation which deforms the housing into a groove formed in the sidewall of the cover, without substantial stretching or thinning of the housing sidewall. While the present invention is particularly suitable for filtering liquids in which high hydrostatic and hydrodynamic forces are incurred, it should be apparent to one of ordinary skill that inventive features are also applicable to other fluid filter applications.

We claim:

1. A high-pressure fluid filter assembly adapted to be supported by a device having a fluid supply and a fluid return, comprising:
   a housing having an open end;
   filter means disposed in said housing;
   a cover partially disposed within the open end of said housing, said cover including flow opening the means for receiving unfiltered fluid from the fluid supply and for returning filtered fluid to the fluid return, said flow opening means including inlet and outlet openings communicating with said fluid supply and fluid return respectively;
   said cover including a one piece member with a peripheral sidewall having a first groove formed therein, said first groove defining an inwardly spaced peripheral sidewall portion and separating said peripheral sidewall into a top portion having a downwardly facing surface extending above said housing and a lower portion having an upwardly facing surface located within said housing; and
   a housing portion proximate said open end deformed into said first groove to secure said cover to said housing.

2. The high-pressure filter of claim 1, wherein said housing portion proximate said open end conforms substantially entirely to the inwardly spaced peripheral portion of said first groove.

3. The high-pressure filter assembly of claim 1, further including means to prevent relative rotation between said housing and said cover.

4. The high-pressure filter assembly of claim 3, wherein said means to prevent rotation includes at least one interruption extending from said first groove, said housing including a corresponding deformed portion such that relative movement between said at least one interruption and said corresponding deformed portion is prevented, thereby preventing rotation between said housing and said cover.

5. The high-pressure filter assembly of claim 4, further including a plurality of said interruptions, said housing including a plurality of corresponding deformed portions.

6. The high-pressure filter assembly of claim 4, wherein said first groove inwardly spaced peripheral portion includes upper and lower walls, said interruption comprising a recess formed in one of said walls.

7. The high-pressure filter assembly of claim 6, wherein said interruption includes a substantially semi-cylindrical opening extending from the upper wall of said first groove, said corresponding deformed housing portion including an edge portion of said housing deformed into said semi-cylindrical opening.

8. The high-pressure filter assembly of claim 1, wherein said cover includes a second groove axially spaced from said first groove, said filter assembly comprising first seal means for forming a seal between said cover and said housing, said first seal means including an O-ring disposed within said second groove.

9. The high-pressure filter assembly of claim 1, wherein said filter assembly includes first seal means for forming a seal between said housing and said cover, said first seal means comprising a sealing member disposed within said first groove.

10. The high-pressure filter assembly of claim 1, wherein said housing portion deformed into said first groove is free of substantial thinning.

11. The high-pressure filter assembly of claim 1, wherein said first groove includes a substantially C-shaped cross-section.

12. The high-pressure filter assembly of claim 1, wherein a first portion of said housing has a thickness greater than a thickness of a second portion of said housing, remote from said cover, said first housing portion including at least said housing portion proximate said open end which is deformed into the first groove.

13. The high-pressure filter assembly of claim 1, further including a collar which at least partially encircles said housing portion proximate said open end which is deformed into the first groove.

14. The high-pressure filter assembly of claim 13, wherein said collar includes a plurality of collar sections which are affixed together about said housing portion proximate said housing open end.

15. The high-pressure filter assembly of claim 1, wherein said cover is formed of aluminum and said housing is formed of drawn steel.

16. The high-pressure filter assembly of claim 1, wherein said first groove includes upper and lower wall portions, and wherein one of said upper wall and lower wall portions is sloped downwardly toward the other of said upper and lower wall portions.

17. The high-pressure filter assembly of claim 1, wherein the proximate portion of said housing deformed into the first groove is rolled upon itself within said groove.

18. The high-pressure filter assembly of claim 1, further including spring means for urging a substantially cylindrical filter element toward said cover.

19. The high-pressure filter assembly of claim 1, wherein said top portion has a diameter which is greater than that of said lower portion.

20. The high-pressure filter assembly of claim 1, further including cover-filter seal means for forming a seal between the cover and a filter element, said cover-filter seal means comprising a ring seal member, a central portion of said ring seal member having a thickness greater than a radially spaced outer portion of said seal member.

21. The high-pressure filter assembly of claim 20, wherein said ring seal member includes inclined means for directing flow of the fluid being filtered.

22. A high-pressure fluid filter assembly comprising:
   a housing having an open end, said housing being deformable when subjected to a predetermined mechanical force;
   a cover at least partially disposed within said open end in a plane generally perpendicular to the central axis of said housing, said cover being resistant to deformation when subjected to said predetermined mechanical force;
   wherein said cover includes:
      a first groove for receiving sealing means for forming a high pressure seal between said cover and said housing, and
      joint forming means for causing a sidewall portion of said housing, when subjected to said predetermined mechanical force, to be deformed radially inwardly into a connection which axially locks said housing with respect to said cover, said joint forming means including a second groove positioned to receive said deformed sidewall portion and to engage said deformed sidewall portion on opposed axial sides to lock said cover in an axial direction with respect to said housing.

23. The high-pressure filter assembly of claim 22, wherein said cover includes a top portion having an enlarged diameter.

24. The high-pressure filter assembly of claim 22, wherein the sidewall portion of said housing which is deformed into the groove is free of substantial thinning.

25. The high-pressure filter assembly of claim 22, wherein said cover includes a plurality of recesses extending from said groove, said housing including selected edge portions deformed into said recesses.

26. The high-pressure filter of claim 22, wherein the sidewall portion of said housing which is deformed into the groove substantially conforms to the interior of the groove.

27. A high-pressure fluid filter assembly adapted to be supported by a support device having a fluid supply and a fluid return, comprising:
   a housing having an open end;
   filter means disposed in said housing;
   a cover at least partially disposed within the open end of said housing, said cover including flow opening means for receiving unfiltered fluid from the fluid supply and for returning filtered fluid to the fluid return, said flow opening means including inlet and outlet openings communicating with said fluid supply and fluid return respectively;
   said cover including a peripheral sidewall having a first groove therein, said first groove defining an inwardly spaced peripheral sidewall portion;
   a housing portion proximate said open end deformed into said first groove; and
   means to prevent relative rotation between said housing and said cover including an interruption extending from said first groove, said housing including a corresponding deformed portion such that relative movement between said interruption and said corresponding deformed portion is prevented, thereby preventing rotation between said housing and said cover, said first groove inwardly spaced peripheral portion including upper and lower walls and said interruption comprising a recess formed in one of said walls.

28. The high-pressure filter assembly of claim 27, wherein said at least one interruption includes a substantially semi-cylindrical opening extending from the upper wall of said first groove, said corresponding deformed housing portion including an edge portion of said housing deformed into said semi-cylindrical opening.

29. The high-pressure filter assembly of claim 27, further including a plurality of said interruptions, said housing including a plurality of corresponding deformed portions.

30. A high-pressure fluid seal assembly adapted to be supported by a device having a fluid supply and fluid return, comprising:
   a housing having an open end;
   a cover partially disposed within the open end of said housing, said cover including flow opening means for at least one of receiving fluid from the fluid supply and returning fluid to the fluid return, said flow opening means including at least one opening communicating with at least one of said fluid supply and fluid return;
   said cover including a one-piece member with a peripheral side wall having a first groove formed therein, said first groove defining an inwardly spaced peripheral side wall portion and separating said peripheral side wall into a top portion having a downwardly facing surface extending above said housing and a lower portion having an upwardly facing surface located within said housing; and
   a housing portion proximate said open end deformed into said first groove to secure said cover to said housing.

* * * * *

UNITED STATES PATENT AND TRADEMARK OFFICE
CERTIFICATE OF CORRECTION

PATENT NO. : 5,080,787

DATED : January 14, 1992

INVENTOR(S) : Gene W. Brown, et. al.

It is certified that error appears in the above-identified patent and that said Letters Patent is hereby corrected as shown below:

On the Title page, item [75], Inventors should read as follows:
--Gene W. Brown; William R. Knox; Steven C. Julson, all of Cookeville, Tenn--

Signed and Sealed this

Twenty-fifth Day of May, 1993

Attest:

MICHAEL K. KIRK

*Attesting Officer*     *Acting Commissioner of Patents and Trademarks*